(12) United States Patent
Garg et al.

(10) Patent No.: US 12,363,113 B2
(45) Date of Patent: Jul. 15, 2025

(54) MANAGEMENT OF SHARED AUTHENTICATION CREDENTIALS

(71) Applicant: Kyndryl, Inc., New York, NY (US)

(72) Inventors: Anuj Kumar Garg, Ghaiziabad (IN); Kuntal Dey, Rampurhat (IN); Jeffrey Robert Stangeland, Brno (CZ); Sanju Soman Chathoth Kurungara, Bangalore (IN); Himanshu Gaur, Delhi (IN)

(73) Assignee: Kyndryl, Inc., New York, NY (US)

( * ) Notice: Subject to any disclaimer, the term of this patent is extended or adjusted under 35 U.S.C. 154(b) by 45 days.

(21) Appl. No.: 18/209,713

(22) Filed: Jun. 14, 2023

(65) Prior Publication Data
US 2023/0328062 A1 Oct. 12, 2023

Related U.S. Application Data

(63) Continuation of application No. 17/127,301, filed on Dec. 18, 2020, now Pat. No. 11,722,489.

(51) Int. Cl.
*H04L 9/40* (2022.01)
*G06F 21/31* (2013.01)
(Continued)

(52) U.S. Cl.
CPC ...... *H04L 63/0876* (2013.01); *H04L 63/0236* (2013.01); *H04L 63/0428* (2013.01);
(Continued)

(58) Field of Classification Search
None
See application file for complete search history.

(56) References Cited

U.S. PATENT DOCUMENTS 8,301,753 B1 10/2012 Melvin
9,047,459 B2 6/2015 Lu
(Continued)

FOREIGN PATENT DOCUMENTS

EP 3937040 1/2022

OTHER PUBLICATIONS

Multi-Level Security for Wireless LAN. Waheed. IEEE. (Year: 2005).*

(Continued)

*Primary Examiner* — Venkat Perungavoor
(74) *Attorney, Agent, or Firm* — Erik Swanson; Andrew M. Calderon; Calderon Safran & Wright P.C.

(57) ABSTRACT

Aspects of the present invention disclose a method, computer program product, and system for management and usage of shared authentication credentials. The method includes one or more processors updating usage information associated with an authentication credential with a media access control address (MAC address) that corresponds to a computing device that corresponds to using the authentication credential. The method further includes one or more processors receiving a login request that includes the authentication credential from a computing device. The method further includes one or more processors fetching a MAC address of the computing device that sent the login request. The method further includes one or more processors validating the authentication credentials and the MAC address.

25 Claims, 4 Drawing Sheets

(51) Int. Cl.
    *G06F 21/33* (2013.01)
    *G06F 21/44* (2013.01)
(52) U.S. Cl.
    CPC .......... *H04L 63/105* (2013.01); *H04L 63/126* (2013.01); *H04L 63/168* (2013.01)

(56) References Cited

U.S. PATENT DOCUMENTS

| | | | |
|---|---|---|---|
| 9,300,671 B1* | 3/2016 | Barak | ............... H04L 63/10 |
| 9,838,383 B1 | 12/2017 | Perlmuter | |
| 11,212,279 B1 | 12/2021 | Levy-Abegnoli et al. | |
| 11,722,489 B2* | 8/2023 | Garg | ............... H04L 63/0428 726/4 |
| 2006/0053276 A1 | 3/2006 | Lortz | |
| 2006/0230437 A1 | 10/2006 | Alexander Boyer | |
| 2009/0132682 A1 | 5/2009 | Counterman | |
| 2010/0175113 A1 | 7/2010 | Borghetti | |
| 2011/0247059 A1 | 10/2011 | Anderson | |
| 2011/0276803 A1 | 11/2011 | Bender | |
| 2011/0277016 A1 | 11/2011 | Hockings | |
| 2012/0204248 A1 | 8/2012 | Gonzalez | |
| 2013/0074164 A1 | 3/2013 | Bartlett | |
| 2013/0212657 A1 | 8/2013 | Lu | |
| 2015/0215301 A1 | 7/2015 | Fischer | |
| 2015/0278510 A1 | 10/2015 | Alexander | |
| 2016/0366141 A1 | 12/2016 | Smith | |
| 2017/0171831 A1 | 6/2017 | Seigel | |
| 2017/0346821 A1* | 11/2017 | Yedidi | ............... H04L 63/0884 |
| 2019/0050557 A1 | 2/2019 | Martin | |
| 2021/0036988 A1 | 2/2021 | McKibben | |
| 2021/0044976 A1 | 2/2021 | Avetisov | |
| 2021/0258308 A1 | 8/2021 | Avetisov | |
| 2021/0344668 A1 | 11/2021 | Limaye | |
| 2022/0182382 A1 | 6/2022 | Leddy, III | |
| 2023/0130876 A1* | 4/2023 | Ufkes | ............... H04W 12/082 726/27 |

OTHER PUBLICATIONS

U.S. Appl. No. 17/127,301, filed Dec. 18, 2020, US 2022-0200988 A1.
Hong et al., "Secure Authentication in Group Communications Using Media Access Control (MAC) Address", Recent Patents on Computer Science 2010, 3, 14-19; Accepted: Jul. 22, 11, 2009; Revised: Aug. 11, 2009, <https://www.eurekaselect.com/93733/article/secure-authentication-group-communications-using-media-access-control-mac-address >.
List of IBM Patents or Patent Applications Treated as Related, dated Jun. 14, 2023, 1 page.
GB Office Action in related GB Application No. GB2117668.0 dated Apr. 29, 2022, 6 pages.
Your IoTs Are (Not) Mine: On the Remote Binding Between IoT Devices and Users. Chen. IEEE. (Year: 2019).
User Credential Cloning Attacks in Android Applications. Cho. IEEE. (Year: 2018).
The Devil is in the (Implementation) Details: An Empirical Analysis of OAuth SSO Systems. Sun. ACM. (Year: 2012).
CN 110417769. English Translation. (Year: 2019).

* cited by examiner

MANAGEMENT OF SHARED AUTHENTICATION CREDENTIALS

BACKGROUND OF THE INVENTION

The present invention relates generally to the field of security, and more particularly to managing shared authentication credentials.

Secure Shell (SSH) is a cryptographic network protocol for operating network services securely over an unsecured network. Typical applications include remote command-line, login, and remote command execution, but any network service can be secured with SSH. SSH provides a secure channel over an unsecured network by using a client-server architecture, connecting an SSH client application with an SSH server. SSH is typically used to log into a remote machine and execute commands, but SSH also supports tunneling, forwarding Transmission Control Protocol (TCP) ports and X11 connections. In addition, SSH can transfer files using the associated SSH file transfer (SFTP) or secure copy (SCP) protocols. SSH is a protocol that can be utilized for many different types of applications across different platforms (e.g., different operating systems).

A media access control address (MAC address) is a unique identifier assigned to a network interface controller (NIC) for use as a network address in communications within a network segment. This use is common in most IEEE 802 networking technologies, including Ethernet, Wi-Fi, and Bluetooth. Within the Open Systems Interconnection (OSI) network model, MAC addresses are used in the medium access control protocol sublayer of the data link layer. As typically represented, MAC addresses are recognizable as six groups of two hexadecimal digits, separated by hyphens, colons, or without a separator. MAC addresses are primarily assigned by device manufacturers, and are therefore, often referred to as the burned-in address, or as an Ethernet hardware address, hardware address, or physical address. Each address can be stored in hardware, such as the card's read-only memory, or by a firmware mechanism.

SUMMARY

Aspects of the present invention disclose a method, computer program product, and system for management and usage of shared authentication credentials. The method includes one or more processors updating usage information associated with an authentication credential with a media access control address (MAC address) that corresponds to a computing device that corresponds to using the authentication credential. The method further includes one or more processors receiving a login request that includes the authentication credential from a computing device. The method further includes one or more processors fetching a MAC address of the computing device that sent the login request. The method further includes one or more processors validating the authentication credentials and the MAC address.

DETAILED DESCRIPTION

Figure 1:
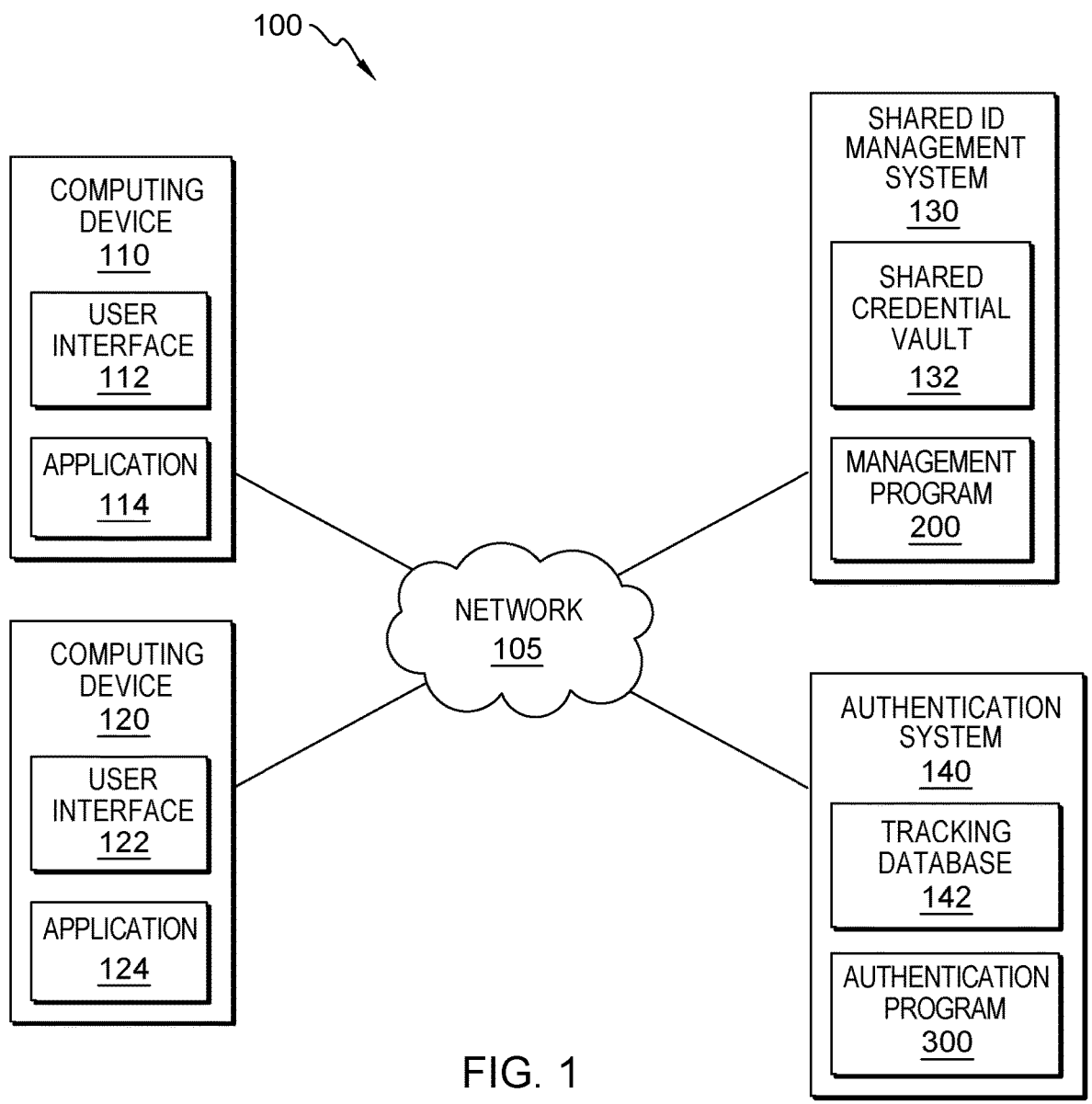
FIG. 1 is a functional block diagram of a data processing environment, in accordance with an embodiment of the present invention.

Embodiments of the present invention allow for a process that extends the functionality of the usage of shared authentication credentials (e.g., shared identification (ID) credentials and passwords), particular in an information technology (IT) infrastructure environment. Accordingly, embodiments of the present invention operate to extend the functionality of existing tools and systems by creating a technology solution to avoid sharing of passwords to bypass a more fully implemented shared authentication credential system. Embodiments of the present invention operate to incorporate the media access control address (MAC address) of a requesting user's device in the process of checking-out and checking-in authentication credentials.

Some embodiments of the present invention recognize that shared authentication credentials are a standard feature of IT infrastructure and are used to provide a common identity for a set of users that perform a specific set of tasks. Embodiments of the present invention recognize that current implementations of shared authentication credentials include sine issues, such as: accountability tracking of which user has used a shared authentication credentials for a particular operation, compliance breaches from sharing passwords for shared IDs, potential mis-sue of shared authentication credentials (e.g., security breaches, etc.), audit exposure and complexity, etc.

In addition, embodiments of the present invention recognize that existing approaches for shared authentication credentials services utilize check-out and check-in processes to maintain individual accountability, and that the users corresponding to the shared authentication credentials are supposed to strictly follow the check-out and check-in processes to maintain the security and accountability of the usage log of the shared authentication credentials. Accordingly, embodiments of the present invention recognize that the existing approaches for the shared authentication credentials tool have many areas for potential leaks. For example, upon check-out, a password can be shared from one user to another individual, bypassing the complete check-out and check-in process.

Also, embodiments of the present invention recognize that if a user does not correctly check-in a credential after use (e.g., and change a corresponding password), then the shared authentication credentials can remain available for potential misuse. Further, embodiments of the present invention recognize that current implementations utilize manual processes for compliance (e.g., via compliance teams) to monitor shared authentication credentials usage, in an effort to ensure that the proper process is followed.

Various embodiments of the present invention operate to extend the functionality provided by existing tools for shared authentication credentials to create a technology solution to implement shared authentication credentials, while avoiding sharing credentials by bypassing the shared authentication credentials system. Embodiments of the present invention provide a check-out process that includes receiving a new password. The transaction of receiving the new password links (binds) the MAC address of the system that provides the request for authentication credentials and updates a corresponding server or database record with an indication of the linked MAC address for the credentials. Further, embodiments of the present invention modify the login script, or corresponding Secure Shell (SSH) protocol to include a setting for matching the MAR address before authorizing the shared authentication credential as a valid login.

Accordingly, embodiments of the present invention utilize the MAC address of the corresponding system as another authentication factor, in combination with the authentication credentials. Therefore, a login will be successful when the MAC address of the device performing the login matches the MAC address linked to the authentication credentials (i.e., the MAC address of the system/device that checked-out the authentication credentials). After usage, the user checks-in the shared authentication credential, and embodiments of the present invention can operate to update the password of the shared authentication credential, reducing the possibility of usage by other individuals (without checking-out). In addition, embodiments of the present invention can maintain the MAC address associated with the shared authentication credentials, until another user (and device) completes a check-out.

Implementation of embodiments of the invention may take a variety of forms, and exemplary implementation details are discussed subsequently with reference to the Figures.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

An embodiment of data processing environment 100 includes client device 110, client device 120, shared ID management system 130, and authentication system 140, all interconnected over network 105. In an example embodiment, shared ID management system 130 is representative of a computing system (e.g., one or more management servers) that manages shared authentication credentials for a group of users (e.g., a groups of users associated with an enterprise), such as users associated with client device 110 and client device 120. In another example embodiment, authentication system 140 is representative of a computing system (e.g., one or more management servers) that provides authentication services to a protected resource and/or asset, to users that utilize shared authentication credentials from shared ID management system 130 (e.g., users associated with client device 110 and client device 120). In other embodiments, data processing environment 100 can include additional instances of computing devices (not shown) that can interface with shared ID management system 130 and authentication system 140, in accordance with various embodiments of the present invention.

Network 105 can be, for example, a local area network (LAN), a telecommunications network, a wide area network (WAN), such as the Internet, or any combination of the three, and include wired, wireless, or fiber optic connections. In general, network 105 can be any combination of connections and protocols that will support communications between client device 110, client device 120, shared ID management system 130, and authentication system 140, in accordance with embodiments of the present invention. In various embodiments, network 105 facilitates communication among a plurality of networked computing devices (e.g., client device 110, client device 120, shared ID management system 130, authentication system 140, and other devices not shown), corresponding users (e.g., users of client device 110, client device 120, etc.), and corresponding management services (e.g., shared ID management system 130 and authentication system 140, etc.).

In various embodiments of the present invention, client device 110 and client device 120 may be a workstation, personal computer, personal digital assistant, mobile phone, or any other device capable of executing computer readable program instructions, in accordance with embodiments of the present invention. In general, client device 110 and client device 120 are representative of any electronic device or combination of electronic devices capable of executing computer readable program instructions. Client device 110 and client device 120 may include components as depicted and described in further detail with respect to FIG. 4, in accordance with embodiments of the present invention.

In an example embodiment, client device 110 and client device 120 are a respective personal workstation or mobile device associated with (e.g., registered to and/or utilized by) a respective user that utilizes one or more shared authentication credentials managed by shared ID management system 130. In one example, a user of client device 110 requests to use (i.e., check-out) a shared authentication credential from shared ID management system 130. Further, in this example, the user of client device 110 utilizes the checked-out authentication credential to attempt to access a protected asset or resource that is managed by authentication system 140. Accordingly, the user of client device 120 cannot utilize the checked-out authentication credential until the user of client device 110 returns the credential to shared ID management system 130, in accordance with embodiments of the present invention.

Client device 110 and client device 120 include respective instances of user interface 112, user interface 122, application 114, and application 124. User interface 112 and user interface 122 are programs that provides an interface between a respective user of client device 110 and client device 120, and a plurality of applications that reside on the device (e.g., application 114 and application 124). A user interface, such as user interface 112 or user interface 122, refers to the information (such as graphic, text, and sound) that a program presents to a user, and the control sequences the user employs to control the program. A variety of types of user interfaces exist. In one embodiment, user interface 112 and/or user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 and/or user interface 122 is a script or application programming interface (API).

Application 114 and application 124 can be representative of one or more applications (e.g., an application suite) that operate on respective instances of client device 110 and client device 120. In various example embodiments, application 114 and application 124 can be an application that a user of client device 110 or client device 120 utilizes to send and/or receive data from shared ID management system 130 and authentication system 140. For example, application 114 and application 124 can be a web browser that the user of client device 110 or client device 120 can access and utilize.

In another example, application 114 and application 124 are enterprise-specific applications, associated with shared ID management system 130, authentication system 140, and/or the corresponding organization. In an additional example, application 114 and application 124 are applications that correspond to accessing a particular protected resource or asset, protected by authentication system 140 (a particular application for a secured asset). In additional embodiments, application 114 and application 124 can send data to, and receive data from, management program 200 on shared ID management system 130 (e.g., as a client-side application of testing program 200), and authentication program 300 on authentication system 140 (e.g., as a client-side application of authentication program 300), in accordance with various embodiments of the present invention.

In example embodiments, shared ID management system 130 can be a desktop computer, a computer server, or any other computer systems, known in the art. In certain embodiments, shared ID management system 130 represents computer systems utilizing clustered computers and components (e.g., database server computers, application server computers, etc.) that act as a single pool of seamless resources when accessed by elements of data processing environment 100 (e.g., client device 110, client device 120, authentication system 140, and other devices not shown). In general, shared ID management system 130 is representative of any electronic device or combination of electronic devices capable of executing computer readable program instructions. Shared ID management system 130 may include components as depicted and described in further detail with respect to FIG. 4, in accordance with embodiments of the present invention.

Shared ID management system 130 includes shared credential vault 132 and management program 200. In various embodiments, shared ID management system 130 operates as a computing system that manages shared authentication credentials for a group of users (e.g., a groups of users associated with an enterprise), such as users associated with client device 110 and client device 120, in accordance with various aspects of the present invention. In one embodiment, shared ID management system 130 provides an improved process for checking-out and checking-in shared authentication credentials, in accordance with embodiments of the present invention.

In various embodiments, shared ID management system 130 stores a plurality of shared authentication credentials in shared credential vault 132. In additional embodiments, shared credential vault 132 also stores usage information corresponding to shared authentication credentials (e.g., check-out and check-in history, etc.). For example, shared credential vault 132 stores a history of which users have utilized particular shared authentication credentials, corresponding MAC addresses, etc. In additional example embodiments, management program 200 utilizes shared credential vault 132 to track in progress (and completed) allocations and assignments (i.e., checking-out) od shared authentication credentials.

Shared credential vault 132 can be implemented with any type of storage device, for example, persistent storage 405, which is capable of storing data that may be accessed and utilized by shared ID management system 130, such as a database server, a hard disk drive, or a flash memory. In other embodiments, shared credential vault 132 can represent multiple storage devices and collections of data within shared ID management system 130.

In example embodiments, management program 200 manages and tracks usage of shared authentication credentials, in accordance with embodiments of the present invention. In various embodiments, management program 200 manages checking-out and checking-in shared authentication credentials to users, and tracking a MAC address corresponding to requesting device of the users, in accordance with embodiments of the present invention. Further, management program 200 communicates with authentication system 140 to manage authentication of the shared authentication credentials.

In example embodiments, authentication system 140 can be a desktop computer, a computer server, or any other computer systems, known in the art. In certain embodiments, authentication system 140 represents computer systems utilizing clustered computers and components (e.g., database server computers, application server computers, etc.) that act as a single pool of seamless resources when accessed by elements of data processing environment 100 (e.g., client device 110, client device 120, shared ID management system 130, and other devices not shown). In general, authentication system 140 is representative of any electronic device or combination of electronic devices capable of executing computer readable program instructions. Authentication system 140 may include components as depicted and described in further detail with respect to FIG. 4, in accordance with embodiments of the present invention.

Authentication system 140 includes tracking database 142 and authentication program 300. In various embodiments, authentication system 140 operates as a computing system that provides authentication services to a protected resource and/or asset, to users that utilize shared authentication credentials from shared ID management system 130 (e.g., users associated with client device 110 and client device 120). In additional embodiments, authentication system 140 is a computing system that utilizes SSH protocols facilitate secure communication and access to secure resources and assets, in accordance with embodiments of the present invention.

In various embodiments of the present invention, the user of client device 110 (or client device 120) is registered with shared ID management system 130 and authentication system 140 (e.g., via a corresponding application). For example, the user completes a registration process, provides information, and authorizes the collection and analysis (i.e., opts-in) of relevant data provided by at least client device 110, by shared ID management system 130 and authentication system 140 (e.g., MAC address, user profile information, user contact information, authentication information, user preferences, or types of information, for shared ID management system 130 to utilize with management program 200 and for authentication system 140 to utilize with authentication program 300).

In various embodiments, tracking database 142 stores information associated with usage of shared authentication credentials, such as a MAC address of a device that has been assigned a shared credential (e.g., a user that has checked-out a credential). In additional aspects, authentication system 140 encrypts information stored in tracking database 142. In example embodiments, tracking database 142 can be an organized collection of data, hosted on authentication system 140.

Tracking database 142 can be implemented with any type of storage device, for example, persistent storage 405, which is capable of storing data that may be accessed and utilized by authentication system 140, such as a database server, a hard disk drive, or a flash memory. In other embodiments, tracking database 142 can represent multiple storage devices and collections of data within authentication system 140.

In example embodiments, authentication program 300 validates authentication credentials, including a MAC address, in accordance with embodiments of the present invention. In various embodiments, authentication program 300 receives a login request from a user and fetches a MAC address of the requesting device of the user. Authentication program 300 can then operate to validate authentication credentials of the login request, and the fetched MAC address, to determine whether to authorize or restrict access to a protected resource, in accordance with embodiments of the present invention.

In various embodiments, authentication system 140 can host a protected/secured asset, or operate as a gateway (i.e., intermediary), to authenticate users prior to access and/or utilization of the protected/secured asset. In another embodiment, shared ID management system 130 and authentication system 140 can be included within a single system, interfacing with users of client device 110 and client device 120, that combines the previously discussed respective functionalities, in accordance with various embodiments of the present invention.

Figure 2:
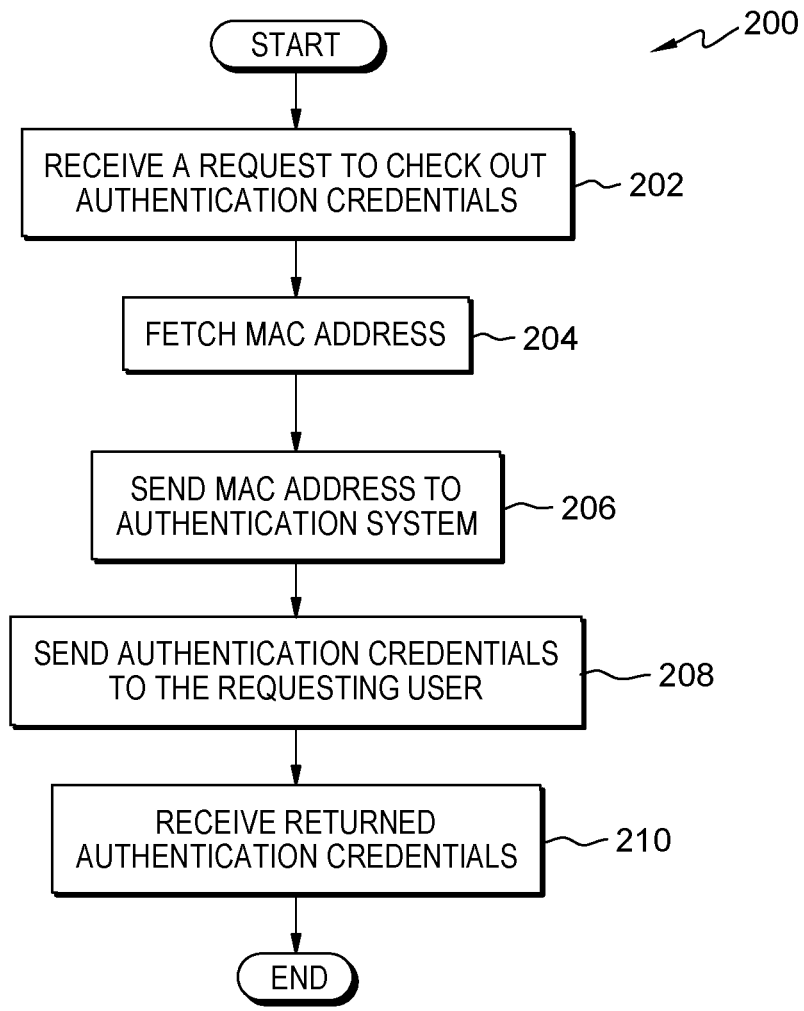
FIG. 2 is a flowchart depicting operational steps of a program for managing and tracking usage of shared authentication credentials, in accordance with embodiments of the present invention.

FIG. 2 is a flowchart depicting operational steps of management program 200, a program for managing and tracking usage of shared authentication credentials, in accordance with embodiments of the present invention. In various embodiments, management program 200 operates on shared ID management system 130 to manage the check-out and check-in process of shared authentication credentials in shared credentials vault 132. In example embodiments, management program 200 operates as a background process, waiting to receive requests from users. In additional embodiments, management program 200 determine whether a user requesting authentication credentials is an authorized user (i.e., a user that is registered and approved to utilize a shared authentication credential), prior to processing the request for credentials.

In step 202, management program 200 receives a request to check-out authentication credentials. In one embodiment, management program 200 receives a request to check-out authentication credentials from a user of client device 110. In some embodiments, the user of client device 110 can request a particular set of authentication credentials from shared credentials vault 132. In additional embodiments, the user of client device 110 can request to access a particular secured resource/asset (e.g., utilizing SSH protocol), and management program 200 can identify the corresponding authentication credentials from shared credential vault 132. In various embodiments, the authentication credentials can be a username and password combination, or any other form of shared authentication credentials that can operate in accordance with various embodiments of the present invention.

In step 204, management program 200 fetches the MAC address. In one embodiment, management program 200 fetches, or retrieves, the MAC address of the requesting computing device, from the computing device via network 105 (i.e., client device 110). A media access control address (MAC address) is a unique identifier assigned to a network interface controller (NIC) for use as a network address in communications within a network segment. In example embodiments, management program 200 fetches the MAC device of client device 110 (utilizing an SSH transmission), for use as an identifying factor/credential for the user utilizing the particular device.

In various embodiments, shared ID management system 130 (and management program 200) can send one or more commands (or utilities), over network 105, to the requesting computing device to fetch (or request) the corresponding MAC address (e.g., based on an operating system of the requesting device). In example scenarios, management program 200 can utilize utilities and commands, such as "getmac" and "ifconfig" or other commands that correspond to characteristics of the particular requesting device. In another embodiment, management program 200 can request that the requesting user provide the MAC address. Then management program 200 can verify that the user-provided MAC address is the correct MAC address for the requesting computing device.

In step 206, management program 200 sends the MAC address to the authentication system. In one embodiment, management program 200 sends the fetched MAC address (from step 204) to authentication system 140. In various embodiments, management program 200 sends the MAC address to authentication system 140 to update the requisite tracking information for the instance of shared credentials in tracking database 142. In another aspect, management program 200 can encrypt the MAC address, and then send the encrypted MAC address to authentication system 140. In an alternate embodiment, management program 200 can send an unencrypted MAC address to authentication system 140, for authentication system to encrypt prior to storage.

In various embodiments, the process of fetching and storing the MAC address of the requesting device binds the shared authentication credential to use by the requesting device (i.e., client device 110), until the requesting device checks-in the authentication credentials. Accordingly, embodiments of the present invention implement an additional security factor in the process of utilizing shared authentication credentials.

In an example embodiment, shared ID management system 130 and authentication system 140 can utilize the iptables utility to manage utilization of the fetched MAC addresses, in accordance with various aspects of the present invention. IPTables is a front-end user space tool to manage Netfilter in Linux kernel. IPTables functions primarily in the Transport (Layer4) and Network (Layer 3), while iptables can also work in the DataLink layer. Embodiments of the present invention can utilize the iptables utility to allow or deny the login request on the basis of the user's device MAC address (described in further detail with regard to FIG. 3. In an example scenario, management program 200 sends a command of "iptables-A INPUT-p tcp--dport #port No. #-m mac--mac-source #MAC Add. #-j ACCEPT" to run on authentication system 140 (i.e., the end server) to modify iptables to block use of the shared authentication credentials, except for a computing device that has a particular MAC address (i.e., the MAC address fetched in step 204).

In step 208, management program 200 sends the authentication credentials to the requesting user. In one embodiment, management program 200 sends the authentication credentials (requested in step 202) to the user on client device 110 (i.e., the requesting computing device, which corresponds to the fetched MAC address). In additional embodiments, management program 200 can send the authentication credentials to the requesting user (step 208) concurrently with sending the MAC address to the authentication system (step 206). In another embodiment, management program 200 can send the authentication credentials to the requesting user after receiving confirmation from authentication system 140 that the MAC address has been received and properly recorded (i.e., utilized to update a record corresponding to the particular instance of shared authentication credentials in tracking database 142).

In step 210, management program 200 receives returned authentication credentials. In one embodiment, management program 200 receives a return (check-in) of authentication credentials from the user of client device 110. In various embodiments, management program 200 waits until receipt of the sent authentication credentials (of step 208). In another aspect, management program 200 can verify that the authentication credentials are received from the same device that requested the credentials (via MAC address comparison). In further embodiments, management program 200 can maintain the binding of the authentication credential to the MAC address of client device 110 until another device (e.g., client device 120) checks-out the authentication credentials.

In another embodiment, management program 200 changes at least one of the authentication credentials in response to receiving a check-in of the credentials. For example, management program 200 changes the password of the authentication credentials, and then stores the updated authentication credentials in shared credential vault 132. In another example, the user of client device 110 can change the password as part of the check-in process of the authentication credentials. In additional embodiments, management program 200 can send the updated authentication credentials to authentication system 140, to update records for us in the authentication process.

Figure 3:
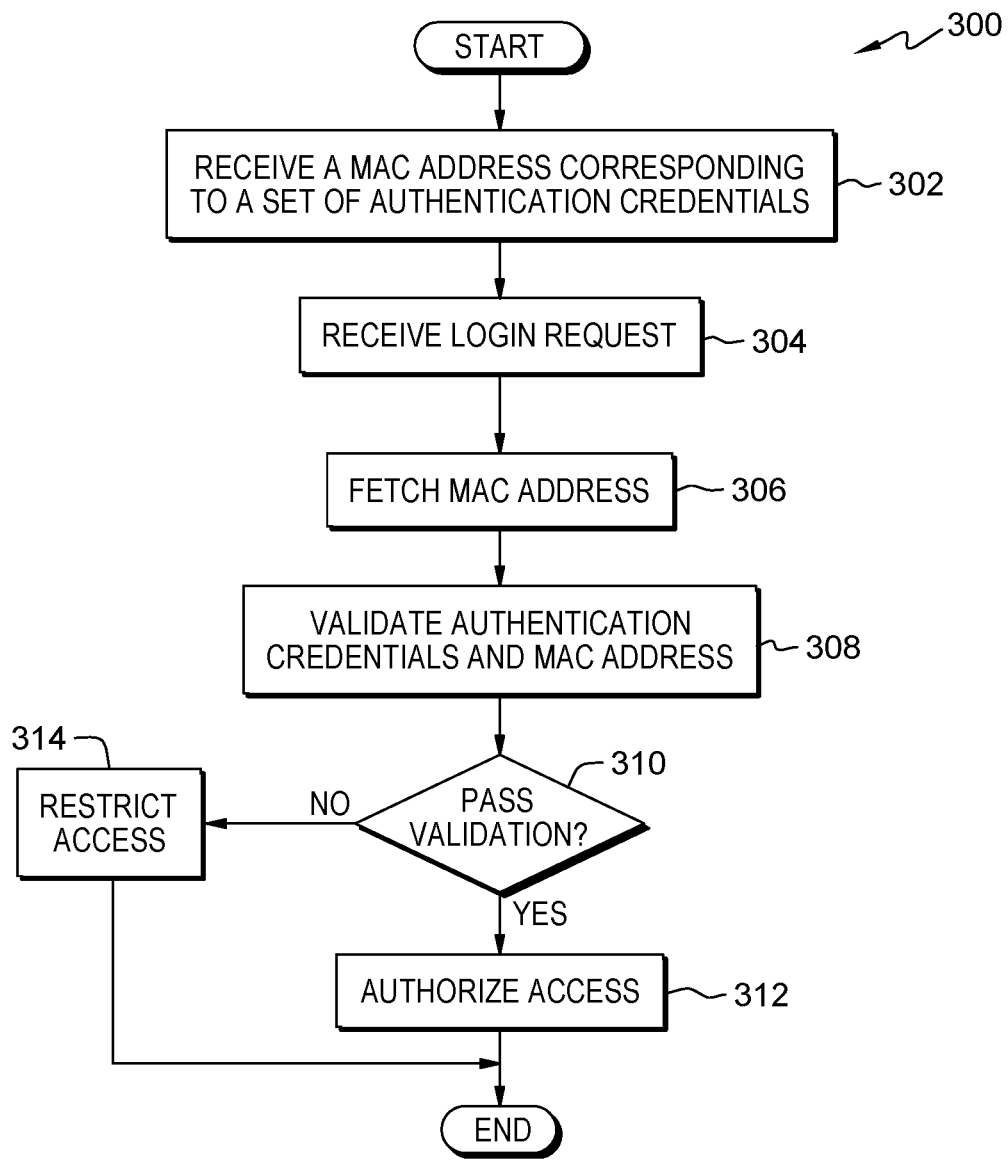
FIG. 3 is a flowchart depicting operational steps of a program for validating authentication credentials, in accordance with embodiments of the present invention.

FIG. 3 is a flowchart depicting operational steps of authentication program 300, a program for validating authentication credentials, in accordance with embodiments of the present invention. In various embodiments, authentication program 300 operates as a process to authenticate users attempting to access a protected asset or resource (e.g., for an enterprise, utilizing SSH). In an example embodiment, authentication program 300 operates as a background process, waiting to receive MAC address information (e.g., from shared ID management system 130) and/or a login request (e.g., from a user utilizing client device 110), in accordance with various embodiments of the present invention.

In step 302, authentication program 300 receives a MAC address corresponding to a set of authentication credentials. In one embodiment, authentication program 300 receives the MAC address of client device 110 from shared ID management system 130 (in step 206 of management program 200). In an example embodiment, authentication program 300 receives a MAC address and an indication of a corresponding set of authentication credentials, from shared ID management system 130, which are bound to the MAC address. In additional embodiments, authentication program 200 can receive an indication of the protected resource or asset. In various embodiments, authentication program 300 receives an encrypted MAC address. In another embodiment, authentication program 300 can encrypt received MAC addresses, prior to storage.

In some embodiments, authentication program 200 (and authentication system 140) can utilize the iptables utility to manage utilization of the fetched MAC addresses, in accordance with various aspects of the present invention (previously discussed with regard to step 206 of management program 200). In an example embodiment, authentication program 300 receives the MAC address (of client device 110) and updates tracking database 142 with information indicating that the AC address is bound to the corresponding set of authentication credentials. For example, authentication program 300 updates tracking database 142 to track that the MAC address of client device 110 is bound with a particular set of authentication credentials. Therefore, authentication program 300 then utilizes the MAC address as an additional authentication factor when validating the particular set of authentication credentials, in accordance with further embodiments of the present invention.

In step 304, authentication program 300 receives a login request. In one embodiment, authentication program 300 receives a request to access a protected/secured resource from a user utilizing client device 110. In various embodiments, authentication program 300 until receipt of a login request, or other form of request, to access a protected resource or asset utilizing authentication credentials. In additional embodiments, authentication program 300 can initiate at step 204, to initiate authentication for a login process. In an example scenario, authentication program 300 receives a login request and corresponding authentication credentials utilizing SSH protocols (e.g., a request to securely log in to a remote machine from client device 110).

In step 306, fetches a MAC address. In one embodiment, authentication program 300 fetches, or retrieves, the MAC address of the requesting computing device, from the computing device via network 105 (i.e., client device 110). In example embodiments, authentication program 300 fetches the MAC device of client device 110 (utilizing an SSH transmission), for use as an identifying factor/credential for the user utilizing the particular device. In various embodiments, authentication system 140 (and authentication program 300) can send one or more commands (or utilities), over network 105, to the requesting computing device to fetch (or request) the corresponding MAC address (e.g., based on an operating system of the requesting device).

In example scenarios, authentication program 300 can utilize utilities and commands, such as "getmac" and "ifconfig" or other commands that correspond to characteristics of the particular requesting device. In another embodiment, authentication program 300 can request that the requesting user provide the MAC address. Then authentication program 300 can verify that the user-provided MAC address is the correct MAC address for the requesting computing device. In additional embodiments, authentication program 300 can receive the MAC address of the requesting device (client device 110) as part of the login request (of step 304) (e.g., included in the SSH login request).

In step 308, authentication program 300 validates authentication credentials and MAC address. In one embodiment, authentication program 300 validates the received authentication credentials (for the login request of step 304) and validates the MAC address of the requesting device (fetched in step 306). In an example embodiment, authentication program 300 compares the received authentication credentials to a database of valid authentication credentials to determine, to determine whether the received authentication credentials match an entry in the database. In addition, authentication program 300 compares the fetched MAC address (of client device 110) to a stored (and encrypted) MAC address associated with the received authentication credentials (stored in tracking database 142) to validate the requesting client device utilizing the MAC address. In various embodiments, authentication program 300 validates the username and password combination, and also the MAC address of the device that sent the username and password.

In decision step 310, authentication program 300 determines whether validation passes. In one embodiment, authentication program 300 determines whether the received authentication credentials (for the login request of step 304) and the MAC address of the requesting device (fetched in step 306) match the corresponding stored valid data. In response to determining that the user (utilizing client device 110) provides correct authentication credentials, authentication program 300 determines that validation passes (decision step 310, YES branch). In response to determining that the user (utilizing client device 110) provides incorrect authentication credentials, authentication program 300 determines that validation does not pass (decision step 310, NO branch).

In step 312, authentication program 300 authorizes access. More specifically, in response to determining that validation does pass (decision step 310, YES branch), authentication program 300 authorizes access to the requested asset/resource (step 312). In some embodiments, authentication program 300 can track the authorized users and devices in tracking database 142. In additional embodiments, authentication program 300 can periodically fetch the MAC address of a connected client device, to validate the identity of the accessing user and device. In another embodiment, authentication program 300 can terminate in response to the user logging out.

In step 314, authentication program 300 restricts access. More specifically, in response to determining that validation does not pass (decision step 314, NO branch), authentication program 300 restricts access to the user that attempted to access the asset/resource. In one embodiment, authentication program 300 can block a user (and device) that fails validation of the MAC address authentication, and then ends.

In another embodiment, in response to determining that validation does not pass (decision step 314, NO branch), authentication program 300 can return to step 304 to allow a subsequent authentication attempt. For example, a system may permit a limited number (e.g., three) of failed login attempts of a username and password of the shared authentication credentials (or potentially for MAC address validation as well), prior to performing an access restricting action on the user and/or device. In various embodiments, authentication program 300 can take an action on the user and/or device that fails validation in accordance with client preferences (e.g., guidelines by an enterprise associated with the user and/or the protected resource/asset).

Figure 4:
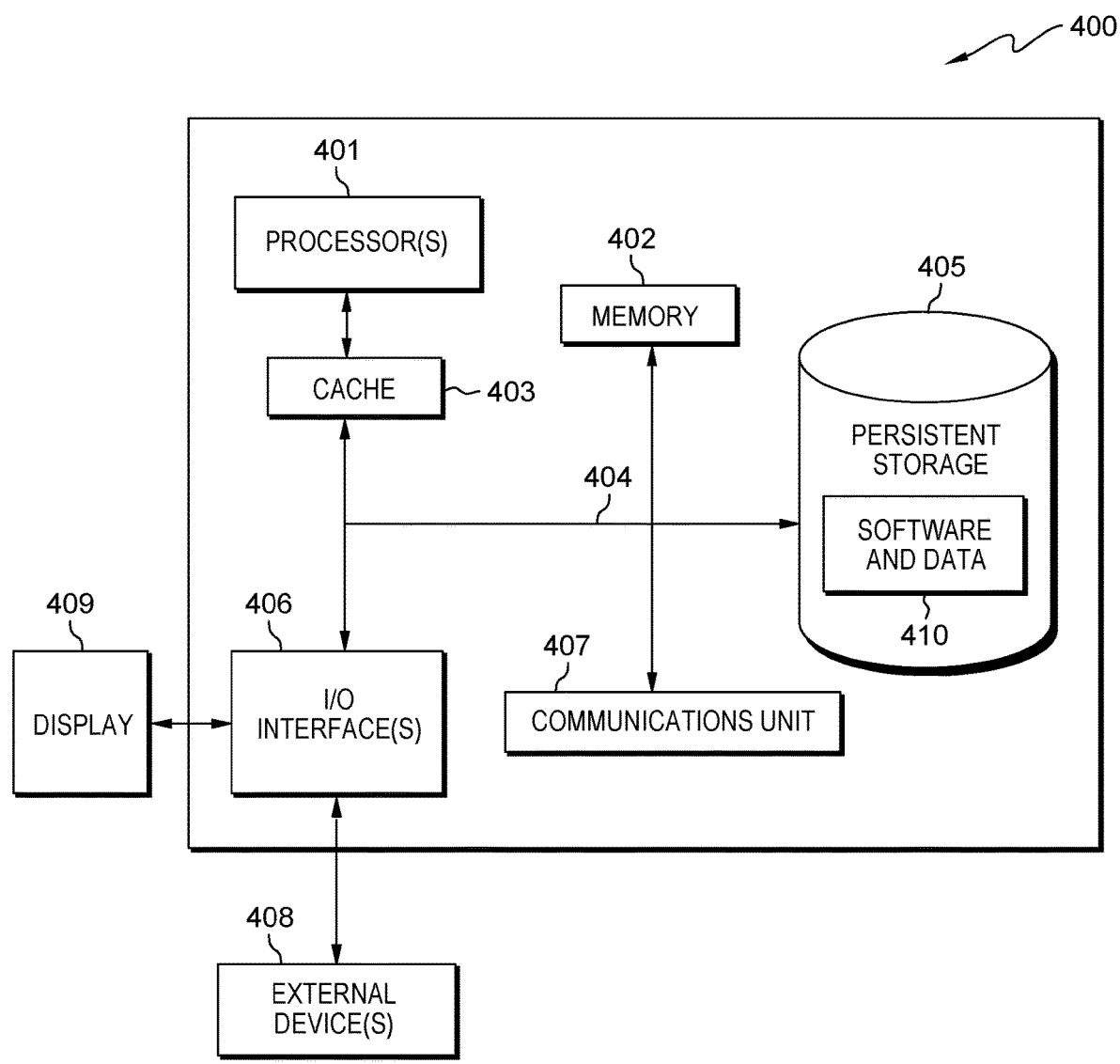
FIG. 4 depicts a block diagram of components of a computing system representative of the client devices, shared ID management system, and authentication system of FIG. 1, in accordance with an embodiment of the present invention.

FIG. 4 depicts computer system 400, which is representative of client device 110, client device 120, shared ID management system 130, and authentication system 140, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made. Computer system 400 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data 410) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 410 can be stored in persistent storage 405 for access and/or execution by one or more of the respective processor(s) 401 via cache 403. With respect to client device 110, software and data 410 includes user interface 112 and application 114. With respect to client device 120, software and data 410 includes user interface 122 and application 124. With respect to shared ID management system 130, software and data 410 includes shared credential vault 132 and management program 200. With respect to authentication system 140, software and data 410 includes tracking database 142 and authentication program 300.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., software and data 410) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., software and data 410) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    maintaining, by one or more processors, a media access control address (MAC address) that corresponds to a computing device associated with an authentication credential, after the computing device checks in the authentication credential, until a second computing device checks out the authentication credential;
    updating, by one or more processors, usage information including a password of the authentication credential with a second MAC address that corresponds to the second computing device as part of a check-in process of the authentication credential by the computing device, in response to the second computing device checking out the authentication credential;
    encrypting, by one or more processors, the second MAC address; and
    storing, by one or more processors, the encrypted second MAC address in the usage information, indicating that use of the authentication credential is bound to the second MAC address.

2. The method of claim 1, further comprising validating utilizing a secure shell (SSH), by one or more processors, the authentication credential and the MAC address.

3. The method of claim 2, further comprising, in response to determining that the validation of the authentication credential and the MAC address passes, authorizing, by one or more processors, the computing device access.

4. The method of claim 2, further comprising, in response to determining that the validation of the authentication credential and the MAC address does not pass, restricting, by one or more processors, access of the computing device.

5. The method of claim 1, wherein updating the usage information is associated with the authentication credential with the second MAC address that corresponds to the second computing device that corresponds to using the authentication credential.

6. The method of claim 1, wherein the authentication credential is a shared authentication credential, associated with a plurality of potential users.

7. The method of claim 1, further comprising:
    receiving, by one or more processors, a login request that includes the authentication credential from the computing device; and
    fetching, by one or more processors, the MAC address of the computing device that sent the login request.

8. The method of claim 7, further comprising validating the authentication credential and the MAC address which comprises:
    determining, by one or more processors, whether the authentication credential matches information in a database of valid authentication credentials; and
    determining, by one or more processors, whether the fetched MAC address of the computing device that sent the login request matches the MAC address in the usage information associated with the authentication credential.

9. The method of claim 7, further comprising restricting access of the computing device, in response to determining that the fetched MAC address of the computing device that sent the login request does not match the MAC address in the usage information associated with the authentication credential.

10. A computer program product comprising:
    one or more computer readable storage media and program instructions stored on the one or more computer readable storage media, the program instructions comprising:
    program instructions to fetch a MAC address of a computing device that sent a login request;
    program instructions to validate a authentication credential and the MAC address;
    program instructions to maintain the MAC address that corresponds to a respective computing device associated with the authentication credential, after the respective computing device checks in the authentication credential, until a second computing device checks out the authentication credential;
    program instructions to update the usage information including a password of the authentication credential with a second MAC address that corresponds to the second computing device as part of a check-in process of the authentication credential by the computing device, in response to the second computing device checking out the authentication credential;
    program instructions to encrypt the second MAC address; and
    program instructions to store the encrypted second MAC address in the usage information, indicating that use of the authentication credential is bound to the second MAC address.

11. The computer program product of claim 10, further comprising program instructions, stored on the one or more computer readable storage media, to:
    in response to determining that the validation of the authentication credential and the MAC address passes by utilizing a secure shell (SSH), authorize the computing device access; and
    in response to determining that the validation of the authentication credential and the MAC address does not pass by utilizing the SSH, restrict access of the computing device.

12. The computer program product of claim 11, wherein the program instructions to update usage information, further comprise program instructions to:
    store the updated authentication credential in a shared credential vault.

13. The computer program product of claim 12, wherein the authentication credential is a shared authentication credential, associated with a plurality of potential users.

14. The computer program product of claim 10, wherein the computer program product further comprises program instructions to:
    prevent enabling the second computing device to use the authentication credential prior to the computing device checking in the authentication credential.

15. The computer program product of claim 10, wherein the program instructions to validate the authentication credential and the MAC address further comprise program instructions to:
  determine whether the authentication credential matches information in a database of valid authentication credentials; and
  determine whether the fetched MAC address of the computing device that sent the login request matches the MAC address in the usage information associated with the authentication credential.

16. A computer system comprising:
  one or more computer processors;
  one or more computer readable storage media; and
  program instructions stored on the computer readable storage media for execution by at least one of the one or more processors, the program instructions comprising:
  program instructions to update usage information including a password of an authentication credential with a MAC address that corresponds to a respective computing device as part of a check-in process of the authentication credential by the computing device, in response to the respective computing device checking out the authentication credential,
  further comprise program instructions to:
  encrypt the MAC address; and
  store the encrypted MAC address in the usage information, indicating that use of the authentication credential is bound to the MAC address.

17. The computer system of claim 16, further comprising program instructions, stored on the computer readable storage media for execution by at least one of the one or more processors, to:
  in response to determining that the validation of the authentication credential and the MAC address passes by utilizing a secure shell (SSH), authorize the computing device access; and
  in response to determining that the validation of the authentication credential and the MAC address does not pass by utilizing the SSH, restrict access of the computing device.

18. The computer system of claim 16, wherein the program instructions to validate the authentication credential and the MAC address further comprise program instructions to:
  determine whether the authentication credential matches information in a database of valid authentication credentials;
  determine whether the fetched MAC address of the computing device that sent the login request matches the MAC address in the usage information associated with the authentication credential; and
  store the updated authentication credential in a shared credential vault.

19. A computer system comprising:
  one or more computer processors;
  one or more computer readable storage media; and
  program instructions stored on the computer readable storage media for execution by at least one of the one or more processors, the program instructions comprising:
  program instructions to update usage information including a password of an authentication credential as part of a check-in process of the authentication credential with a media access control address (MAC address) that corresponds to a respective computing device that corresponds to using the authentication credential;
  program instructions to encrypt the MAC address that corresponds to the respective computing device;
  program instructions to store the encrypted MAC address in the usage information, indicating that use of the authentication credential is bound to the MAC address that corresponds to the respective computing device;
  program instructions to receive a login request that includes the authentication credential from a computing device;
  program instructions to fetch a MAC address of the computing device that sent the login request; and
  program instructions to validate the authentication credentials and the MAC address.

20. The computer system of claim 13, further comprising program instructions, stored on the computer readable storage media for execution by at least one of the one or more processors, to:
  in response to determining that the validation of the authentication credentials and the MAC address passes by utilizing a secure shell (SSH), authorize the computing device access.

21. The computer system of claim 13, further comprising program instructions, stored on the computer readable storage media for execution by at least one of the one or more processors, to:
  in response to determining that the validation of the authentication credentials and the MAC address does not pass by utilizing a secure shell (SSH), restrict access of the computing device.

22. The computer system of claim 13, wherein the program instructions to update usage information associated with an authentication credential with a MAC address that corresponds to a respective computing device that corresponds to using the authentication credential, further comprise program instructions to:
  store the updated authentication credential in a shared credential vault.

23. The computer system of claim 13, wherein the authentication credential is a shared authentication credential, associated with a plurality of potential users.

24. The computer system of claim 13, wherein the program instructions to validate the authentication credentials and the MAC address further comprise program instructions to:
  determine whether the authentication credentials match information in a database of valid authentication credentials; and
  determine whether the fetched MAC address of the computing device that sent the login request matches the MAC address in the usage information associated with the authentication credential.

25. The method of claim 1, further comprising storing, by one or more processors, the updated authentication credential in a shared credential vault.

* * * * *